(12) United States Patent
Houk

(10) Patent No.: US 6,537,448 B2
(45) Date of Patent: Mar. 25, 2003

(54) FLOOR SINK FILTER BASKET

(76) Inventor: Lee Houk, 6440 Sapphire St., Alta Loma, CA (US) 91701

( * ) Notice: Subject to any disclaimer, the term of this patent is extended or adjusted under 35 U.S.C. 154(b) by 0 days.

(21) Appl. No.: 09/733,709

(22) Filed: Dec. 8, 2000

(65) Prior Publication Data

US 2002/0070151 A1 Jun. 13, 2002

(51) Int. Cl.⁷ .............................. E03F 5/04; B01D 29/37
(52) U.S. Cl. ..................... 210/164; 210/238; 210/452; 210/470; 210/474
(58) Field of Search ............................. 210/164, 238, 210/452, 470, 474, 166

(56) References Cited

U.S. PATENT DOCUMENTS

| | | | |
|---|---|---|---|
| 565,890 A | * | 8/1896 | Fowler |
| 3,713,539 A | * | 1/1973 | Thompson et al. |
| 4,321,813 A | * | 3/1982 | Thompson |
| RE31,561 E | * | 4/1984 | Thompson et al. |
| 4,816,148 A | * | 3/1989 | Hemman |
| 5,486,287 A | * | 1/1996 | Murphy et al. |
| 5,601,711 A | * | 2/1997 | Sklar et al. |

* cited by examiner

*Primary Examiner*—Thomas M. Lithgow
(74) *Attorney, Agent, or Firm*—Lawrence S. Cohen

(57) ABSTRACT

A plastic floor drain for use with a floor sink in which a thin lip is provided around the outside of an upper edge to provide good engagement with the sides of the floor sink to prevent leakage between the sides of the floor sink and the sides of the floor drain. Also, in order to provide controlled nesting, a recess and interacting tabs are provided to control the depth of nesting. An alternative structure to provide controlled nesting is a recess in each side that provides an inside projecting surface on which an upper filter basket floor rests.

5 Claims, 2 Drawing Sheets

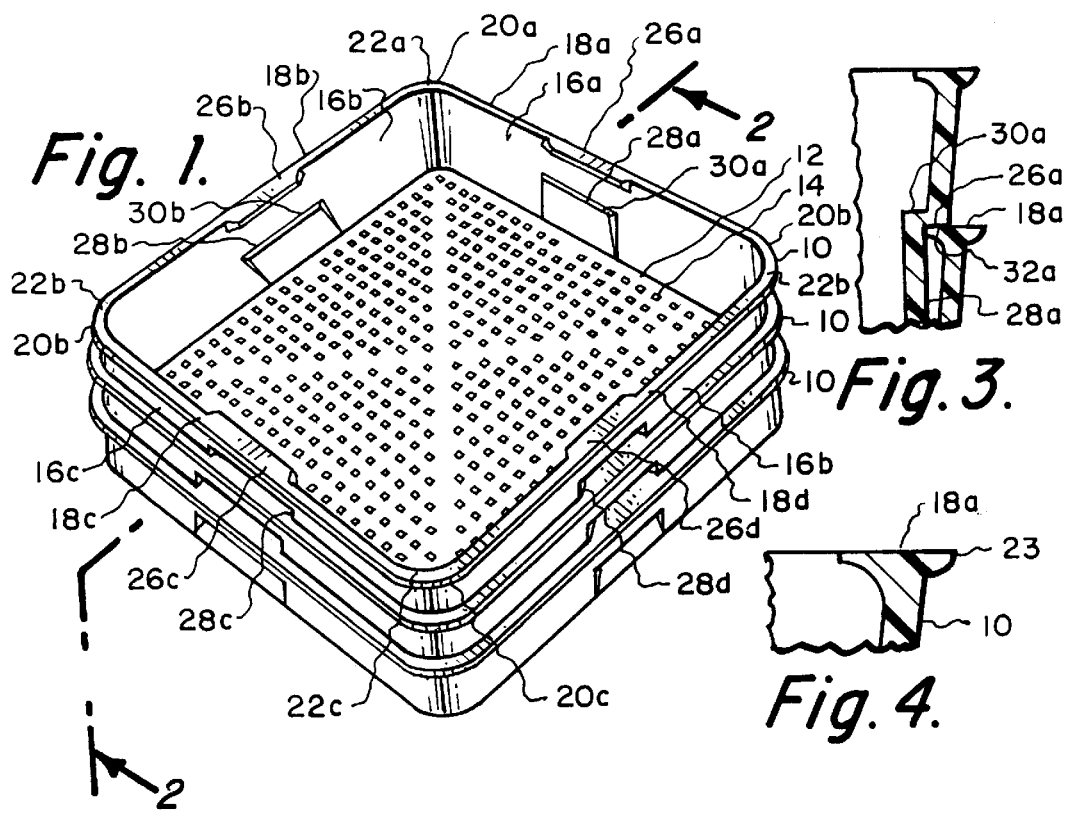
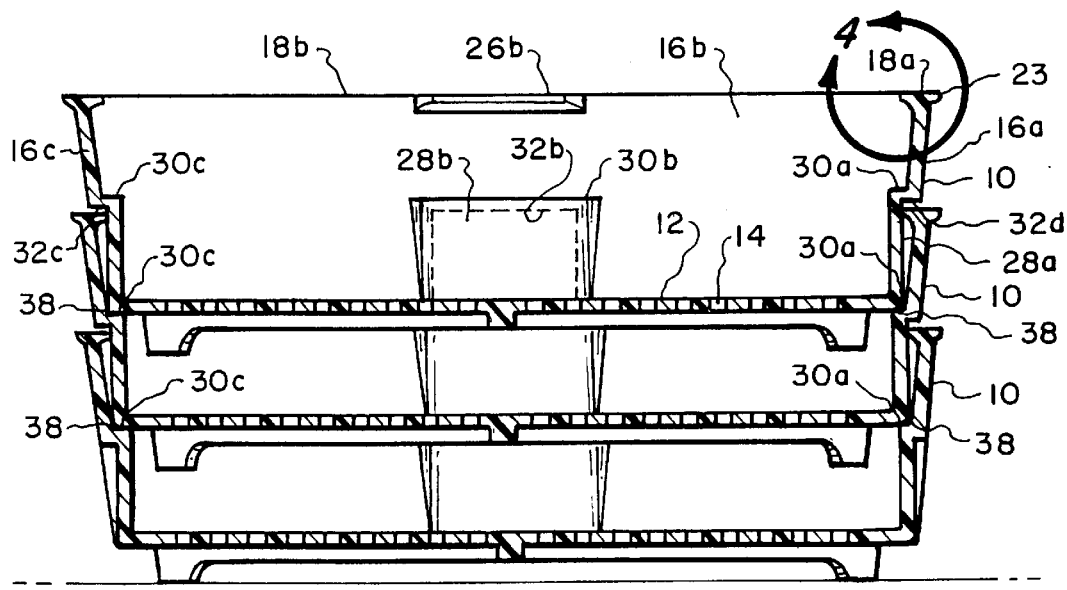

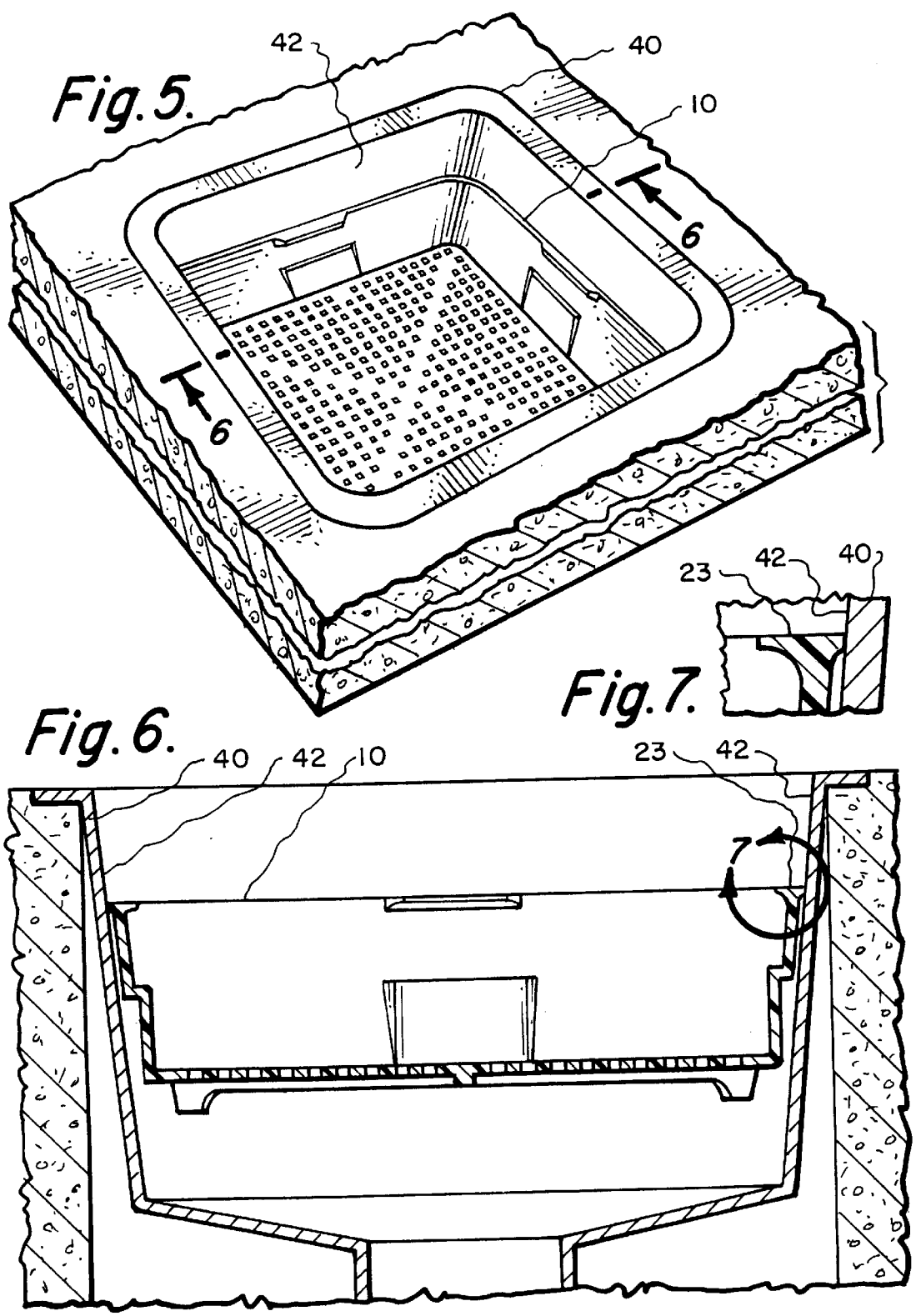

FLOOR SINK FILTER BASKET

FIELD OF THE INVENTION

The invention relates to floor sink filter baskets.

BACKGROUND OF THE INVENTION

A floor sink is a common installation found in commercial kitchens and toilets among other places. In particular in kitchens it is important to have a floor sink filter basket that fits into the floor sink in order to catch food debris so that it can be disposed of instead of going into the drain system or blocking the flow of water out the bottom of the sink into a drain system.

Sometimes floor debris can escape past the filter basket by way of overflowing it's sides through spaces between the floor sink and the filter basket.

Also, in shipping the filter basket through a distribution and sales network, it is helpful to reduce the amount of space occupied by a shipment of a number of units by nesting them, allowing their slanted sides to engage. But this nesting can create a tight friction fit with a lot of contact making disengagement difficult.

SUMMARY OF THE INVENTION

The invention refers to two aspects in the design of filter baskets for use with floor drains.

In one aspect, the invention resides in an elastomeric lip around the top of the filter basket which lip extends outwardly from the basket. Since the filter basket is made of plastic, the lip has flexibility to provide a good seal between the filter basket and the floor sink to prevent solid debris which is intended to be collected in the filter basket from, instead, escaping through any space between the filter basket and the floor sink.

In another aspect, mating tabs and recesses are provided in each side of the filter basket so that the tab can engage the recess and provide controlled nesting and enable easy unstacking of filter baskets which have been nested for shipment. Preferably for maximum convenience when the filter baskets are square, that is having sides of equal length, the recess is situated centrally of each side, extending from the bottom to a selected point, preferably about half way up the sides and the tab is also centrally located extending inwardly from the top edge of each side. Therefor when stacked, the respective tab engages the recess and will to stop the nesting at a selected amount. In an alternative form, the bottom of one filter basket contacts the inside top of the recess of a filter basket which is nested below it in which case the tab is not necessary, although it is still useful to grab making unnesting easier.

BRIEF DESCRIPTION OF DRAWINGS

FIG. 1 shows three stacked filter baskets made according to the invention.

FIG. 2 shows a section view through 2—2 of FIG. 1 showing one of the nesting arrangements.

FIG. 3 shows a partial section view of an alternative embodiment of the nesting arrangement.

FIG. 4 shows a partial enlarged section view of portion 4 of FIG. 2.

FIG. 5 shows a filter basket of the invention installed in a floor sink.

FIG. 6 shows a section view through 6—6 of FIG. 5 showing a filter basket of the invention installed in a floor sink.

FIG. 7 shows a partial enlarged section view of portion 7 of FIG. 6 showing the sealing arrangement.

DETAILED DESCRIPTION

Referring to FIGS. 1 and 2, there is shown three filter baskets 10 in stacked relationship, each filter basket having a bottom 12 and perforations 14, and sides 16a, 16b, 16c and 16d. In the preferred embodiment the bottom 12 is square and therefore the sides 16a–d are of equal length. The square configuration is most common because most floor sinks are square. The sides 16a–d extend from the bottom 12 upwardly at a divergent angle and define top edges 18a, 18b, 18c and 18d, in the preferred embodiment being of equal length. The sides 16a–d are joined by rounded corners 20a, 20b, 20c and 20d, which have a top edge 22a, 22b, 22c and 22d so that the top edges 18a–d and 22a–d form a continuous to edge. The edge has an outwardly projecting flexible lip 23. Each side 16a–d has at its top edges 18a–d, tabs 26a, 26b, 26c and 26d, centrally located and extending inwardly. Also, each of sides 16a–d has a recess 28a, 28b, 28c and 28d formed to define a recess upper surface 30a, 30b, 30c and 30d and a recess lower surface 32a, 32b, 32c and 32d. In such case, the nesting engagement between nested floor drains is primarily between the recess upper surfaces 30a–d and the bottom 12. Preferably, the recesses extend about half way up the sides.

Referring to FIGS. 1 and 2, there is shown an aspect of the invention in which controlled and easily disengageable nesting of the floor drains is possible. Since the sides 16a–d are divergently angled it is possible to nest them. Nesting control is shown in FIG. 2, in which the recess upper surfaces 30a–d are contacted by the outside surface of the bottom 12 as shown at 38.

With further reference to FIG. 3 an alternative form of nesting control is shown in which the recesses 28a–d and the tabs 26a–d are dimensioned so that upon nesting, the tabs 26a–d will move upwardly into the recesses 28a–d until there is contact between the tabs 26a–d and the recess lower surfaces 32a–d respectively and the nesting will be limited by that contact. In such case, the nesting engagement between nested floor drains is primarily between the tabs 26a–d and the recesses lower surfaces 32a–d, so that disengagement is easy. With this structure, in use, the floor drains 10 can be nested or stacked, as shown in FIGS. 1 and 4 with the tabs 26a–d and the recess lower surfaces 32a–d controlling the positioning and the amount of nesting to avoid difficulty in disengagement.

In another aspect of the invention, referring to FIGS. 4, 5, 6, and 7, in use the floor drain 10 is placed in a floor sink 40, which has angled sides 42 so that the floor drain 10 drops in to a point at which the lip 23 will engage the sides of the floor drain to create a seal. With the seal, solid debris will not escape even when the floor drain is overflowed, and if the space below the floor drain is filled with water, the floor drain will resist floating due to friction of the engagement of the lip 23 with the respective sides of the floor sink.

Also, as seen in FIGS. 2 and 7, the filter basket has four legs at 90 degree angels to each other. The legs are about ⅜ inch to ½ inch high. The legs will engage the bottom of the sink if the basket is not stopped by engagement with the sides, thereby keeping the bottom of the filter basket above the bottom of the sink. This will facilitate drainage.

Although particular embodiments of the invention have been described and illustrated herein, it is recognized that modifications and variations may readily occur to those skilled in the art, and consequently it is intended that the claims be interpreted to cover such modifications and equivalents.

What is claimed is:

1. A filter basket in combination with a floor sink comprising;
   - a floor sink having four sides downwardly convergent at the same angle;
   - a filter basket having four sides extending from a perforated bottom each side being of equal height and terminating in a top edge, the top edge of said sides being in the same plane;
   - a flexible elastomeric lip coextensive with the top edge of each side, extending outwardly thereof defining a sealing element to create a seal when the filter basket is inserted in the floor sink; and
   - the filter basket being supported in the floor sink by sealing contact of the sealing element with the downwardly convergent sides of the floor sink.

2. The filter basket of claim 1 wherein said lip has a gradually decreasing thickness as it extends away from the top edge of the lip.

3. A filter basket comprising;
   - a square perforated bottom and sides extending upwardly and at a divergent angle from the periphery of the bottom, terminating in a top edge and each side defining an outside surface;
   - each side having a recess centrally located thereof in the outside surface extending from proximate the bottom a selected equal distance upwardly toward the top edge and terminating in a recess lower surface; and
   - a tab on each side centrally located proximate the top of each side and extending inwardly the tab and recess of selected dimensions such that when one filter basket is stacked upon another mating tabs of the lower filter basket will enter and engage with respective mating recesses to allow a controlled depth of stacking with minimum contact.

4. A filter basket comprising;
   - a square perforated bottom and sides extending upwardly at a divergent angle from the periphery of the bottom, terminating in a top edge and each side defining an outside surface; and
   - each side having a recess centrally located thereof extending from proximate the bottom a selected equal distance upwardly toward the top edge terminating in a recess upper surface projecting on the inside of each side such that when one filter basket is stacked upon another the floor of the upper filter basket will engage the recess upper surfaces of the lower filter basket to allow a controlled depth of stacking with minimum contact.

5. A method for use of a filter basket with a floor sink having a square shape and downwardly convergent sides comprising;
   - configuring a square filter basket with four sides extending from a perforated bottom each side being of equal height and terminating in a top edge, the top edge of said sides being in the same plane and having a flexible elastomeric lip coextensive with the top edge of each side, extending outwardly thereof defining a sealing element;
   - inserting the filter basket into a floor sink having downwardly convergent sides until the sealing element of the filter basket contacts the downwardly convergent sides of the floor sink to support the filter basket in the floor sink and to create a seal between the filter basket and the floor sink.

* * * * *